US 6,634,724 B2

(12) United States Patent
Kobayashi et al.

(10) Patent No.: US 6,634,724 B2
(45) Date of Patent: Oct. 21, 2003

(54) ELECTRICALLY DRIVEN BRAKE BOOSTER

(75) Inventors: Kazuo Kobayashi, Saitama-Ken (JP); Hidefumi Inoue, Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 10/094,358

(22) Filed: Mar. 8, 2002

(65) Prior Publication Data
US 2002/0158510 A1 Oct. 31, 2002

(30) Foreign Application Priority Data
Apr. 26, 2001 (JP) ........................ 2001-129887

(51) Int. Cl.[7] .................. B60T 8/60; B60T 13/74
(52) U.S. Cl. ................. 303/155; 60/545; 91/367; 188/1.11 E; 188/162; 303/13; 303/14; 303/113.4; 303/115.2; 303/DIG. 3
(58) Field of Search ................. 188/158, 162, 188/1.11 R, 355–359, 1.11 E, 156; 303/115.2, 155, 113.4, 114.3, 115.1, 113.2, 193, 13–14, 113.3, DIG. 3, 166, DIG. 4, 125, 191, 20, 3, 114.1; 60/545; 91/367, 376 R, 361, 369.2, 369.1; 701/70, 96, 78; 318/488; 74/388 PS

(56) References Cited
U.S. PATENT DOCUMENTS
4,812,723 A * 3/1989 Shimizu ....................... 60/545
6,220,675 B1 * 4/2001 Steffes ...................... 303/113.3

FOREIGN PATENT DOCUMENTS
JP 6-9964 2/1994
JP 6-104448 12/1994
JP 8150923 * 6/1996

* cited by examiner

Primary Examiner—Douglas C. Butler
(74) Attorney, Agent, or Firm—Flynn, Thiel, Boutell & Tanis, P.C.

(57) ABSTRACT

An electrically driven brake booster (1) includes an input member (4) disposed in operative association with a brake pedal (12), an output member (5) disposed in operative association with the master cylinder (6), and drive transmitting device (10) for translating a rotating motion of a motor (9) into a linear motion to be transmitted to the output member (5). The drive transmitting device (10) comprises a rack (23) formed on the output member (5), and pinions (21, 22) disposed in operative association with the motor (9) and in meshing engagement with the rack (23). Also, reaction transmitting device (8) which transmits a brake reaction to the input member (4) and the output member (5) at a given proportion is provided. In comparison to conventional drive transmitting device, the drive transmitting device (10) of the present invention has a simple construction, a reduced weight and a better transmission efficiency. The provision of reaction transmitting device allows a correct brake control to be achieved on the basis of a brake reaction.

4 Claims, 3 Drawing Sheets

ELECTRICALLY DRIVEN BRAKE BOOSTER

TITLE OF THE INVENTION

Electrically driven brake booster

1. Field of the Invention

The present invention relates to a brake booster, and more particularly, to an electrically driven brake booster.

2. Description of the Prior Art

An electrically driven brake booster is known in the art as disclosed in Japanese Patent Publications No. 9,964/1994 and No. 104,448/1994. The disclosed booster comprises an input member disposed for back-and-forth movement in operational association with a brake pedal, an output member disposed in operative association with the piston of a master cylinder, drive transmitting means for translating a rotating motion of a motor into a linear motion which is transmitted to the output member, and a controller for controlling the motor in accordance with a variable representing an amount by which the brake pedal is maneuvered. The drive transmitting means in this booster comprises a ball-and-screw mechanism which translates the rotating motion of the motor into the linear motion of the output member, thus integrally coupling the input member and the output member.

However, the ball-and-screw mechanism uses an increased number of parts and is complex in arrangement, resulting in disadvantages of an increased weight and a poor transmission efficiency.

In the above disclosures, because the input member and the output member are coupled together integrally, in the event the motor fails for some reason, there results a disadvantage that the master cylinder cannot be directly operated by a driver maneuvering the brake pedal.

A solution to the issue of failure of the motor is proposed in Japanese Laid-Open Patent Application No. 175, 376/1997 where an input member and an output member are arranged so that their axes run parallel and in which the input member has an operational association with the brake pedal and the master cylinder while the output member is arranged to engage the input member only during the forward drive.

Thus, when the motor operates normally, the output member is engaged with the input member, to which a propelling force can be applied. If the motor should fail, though the propelling force cannot be applied, the master cylinder can be directly operated only through the input member in response to the depression of the brake pedal by the driver.

However, the electrically driven brake booster of this cited Application suffers from a further complexity in arrangement and added weight as compared with the boosters disclosed in the above Publications.

There also remains another problem in either disclosure that a result of boosting operation by the booster cannot be correctly fed back to the brake pedal because of the operational association between the input shaft and the piston of the master cylinder.

More specifically, in these electrically driven brake boosters, an input applied by the driver to the brake pedal is directly reflected as a reaction, and the driver has no way of determining whether or not the booster is operating in a correct manner, thus hindering a correct brake operation.

In addition, the disclosed arrangements set up a booster ratio of the electrically driven brake booster in an electrical manner by the controller which controls the motor, but this poses a problem in respect of the reliability as compared with a mechanical set-up of the booster ratio which is effected in a conventional oil pressure booster or the negative pressure booster.

SUMMARY OF THE INVENTION

In view of the foregoing, it is an object of the present invention to provide an electrically driven brake booster of a reduced weight and a simple construction and having an improved transmission efficiency while allowing a master cylinder to be directly operated by an operation of a brake pedal if a motor fails.

It is another object of the invention to provide an electrically driven brake booster which enables a correct brake operation on the basis of a brake reaction.

According to a first aspect of the invention, there is provided an electrically driven brake booster including an input member disposed for back-and-forth movement in operational association with a brake pedal, an output member disposed in operative association with the piston of a master cylinder, drive transmitting means for translating a rotating motion of a motor into a linear motion to be transmitted to the output member, and a controller for controlling the motor in accordance with a variable representing an amount by which the brake pedal is maneuvered, the drive transmitting means comprising a rack formed on the output member and a pinion disposed in operational association with the motor and in meshing engagement with the rack.

According to the first aspect of the invention, the drive transmitting means which comprises the rack and the pinion has a reduced weight and a simple construction in comparison to a conventional drive transmitting means which comprises a ball and a nut, and has a better transmission efficiency. If the motor fails, the master cylinder can be directly operated by maneuvering the brake pedal.

According to the second aspect of the invention, the provision of reaction transmitting means which transmits a reaction from the master cylinder to the output member and the input member at a given proportion enables an accurate brake operation on the basis of a brake reaction transmitted to the input member.

Above and other objects, features and advantages of the invention will become apparent from the following description of several embodiments thereof with reference to the drawings.

DETAILED DESCRIPTION OF THE EMBODIMENTS

Figure 1:
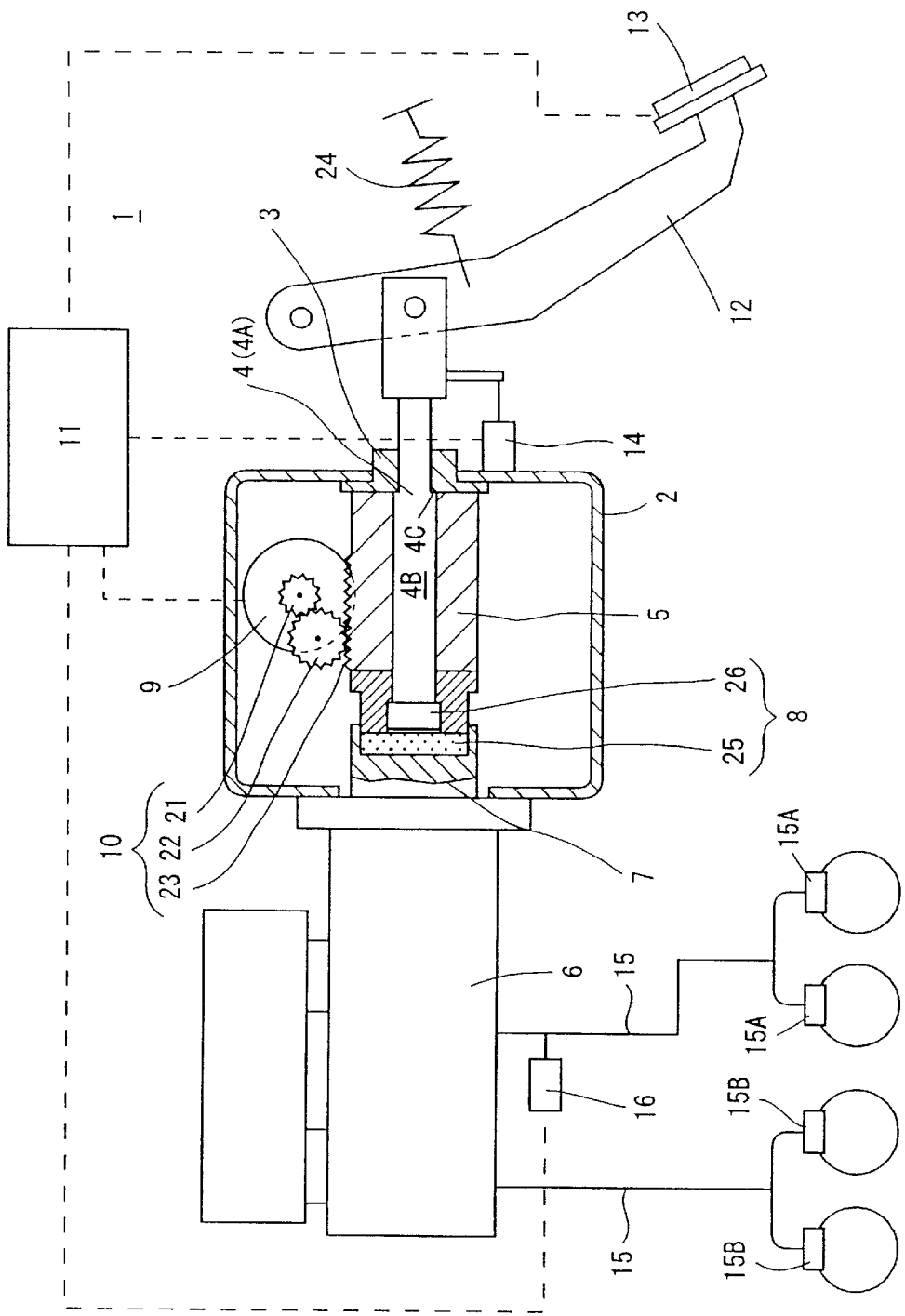
FIG. 1 is a longitudinal section of an electrically driven brake booster 1 according to one embodiment of the invention.

Several embodiments of the invention will now be described. Referring to FIG. 1, there is shown an electrically driven brake booster 1 which boosts a depressing force by a motor 9. The electrically driven brake booster 1 can be operated to serve as a brake in response to a normal depression of a driver, and also can be automatically operated to provide a braking action during a brake assist operation or in an auto-cruise operation whenever necessary.

The electrically driven brake booster 1 comprises a housing 2, a tubular stop member 3 secured to a rear opening of the housing 2, an input member 4 having a portion of a reduced diameter 4A which is fitted into the stop member 3 from the front side to be slidably carried therein and having a free end projecting externally and connected with a brake pedal 12 in a rockable manner, a tubular output member 5 slidably fitted over a portion of an increased diameter 4B of the input member from the front side, a master cylinder 6 secured to a front end of the housing 2, a piston 7 extending into the master cylinder 6 through the front opening of the housing 2 and supporting the front end of the output member 5 in a slidable manner, reaction transmitting means 8 disposed within the piston 7 and located forwardly of the input member 4 and the output member 5, a servo motor 9 (hereafter simply referred to as motor 9) disposed in the housing so as to be located above the output member 5 and extending in a direction orthogonal to the output member 5, drive transmitting means 10 for translating a rotating motion of the motor 9 into a linear motion to be transmitted to the output member 5, and a controller 11 for controlling the motor 9.

The controller 11 receives a measured value representing a force of depression from a depressing force sensor 13 mounted on the brake pedal 12, a measuring value representing a displacement of the input member 4 from a displacement sensor 16 disposed outside the housing 2, and a measured value representing a braking liquid pressure from a liquid pressure sensor 16 which is disposed in a braking liquid passage 15 which connects between the master cylinder 6 and a front wheel cylinder 15A. The controller 11 controls the motor 9 on the basis of the measured values from these sensors 13, 14 and 16. When the motor 9 rotates with a commanded torque, the rotating motion of the motor is translated by the drive transmitting means 10 into a linear motion, and the output member 5 is driven forward with a propelling force which depends on the commanded torque.

The drive transmitting means 10 comprises a first pinion gear 21 which is integrally mounted on the drive shaft of the motor 9, a second pinion gear 22 rotatably journalled on the housing 2 and meshing with the first pinion gear 21 to serve as a reduction gear, and a rack 23 formed on the top portion of the output member 5 around the outer periphery and extending in a direction of back-and-forth movement thereof (or in the axial direction). Consequently, when the motor 9 rotates in either forward or reverse direction, the first pinion gear 21 rotates in a corresponding direction, causing its meshing second pinion gear 22 to rotate also in a corresponding direction. In this manner, the output member carrying the rack 23 which meshes with the second pinion gear 22 moves back and forth.

When the brake pedal 12 is not depressed, the controller 11 maintains the output member 5 at rest at an inoperative position shown where it abuts against the stop member 3. On the other hand, the input member 4 stays at rest in its inoperative position shown where a step 4C between the portion 4A and 4B of a reduced diameter and an increased diameter abuts against the stop member 3 under the resilience of a return spring 24 which is disposed between the brake pedal 12 and a car body, not shown.

The reaction transmitting means 8 comprises a reaction disc 25 formed of an elastic material which is received within the piston 7 and abuts against the front end face of the output member 5, and a disc-shaped reaction plate 26 slidably fitted into a front portion of the output member 5 at a location rearward of the reaction disc 25 for abutment against the front end face of the input member 4. In this manner, part of a brake reaction from the piston 7 of the master cylinder 6 is transmitted to the output member 5 through the reaction disc 25, and part of the brake reaction from the piston 7 is also transmitted to the input member 4 through the reaction disc 25 and the reaction plate 26. A booster ratio of the electrically driven brake booster 1 can be suitably set up in accordance with the proportion of areas of abutment of the input member 4 (reaction plate 26) and the output member 5 against the reaction disc 25.

When the electrically driven brake booster 1 is inoperative, a given clearance is maintained between the reaction disc 25 and the reaction plate 26 to enable a jumping response that an output rises sharply without transmission of a brake reaction from the instant the brake pedal 12 is depressed until the reaction disc 25 abuts against the reaction plate 26.

The operation of the electrically driven brake booster 1 constructed in the manner mentioned above will be described. Initially, in the inoperative condition where the brake pedal 12 is not depressed, the resilience of the return spring 26 urges the brake pedal 12 and the input member 4 rearward, whereby the step 4C of the input member 4 stays at rest at its retracted end position where it abuts against the stop member 3. On the other hand, the controller 11 maintains the motor 9 at rest at its position where it has rotated to the maximum extent in the reverse direction and maintains the rear end face of the output member 5 at its retracted end position where it abuts against the stop member 3. Under this condition, the clearance mentioned above is maintained between the reaction disc 25 and the reaction plate 26, while the output member 5 abuts against the reaction disc 25.

If the brake pedal 12 is now depressed, its connected input member 4 and the reaction plate 26 which abuts against the input member are driven forward, whereupon the controller 11 energizes the motor 9 with a drive current which depends on a force of depression signal fed from the depressing force sensor 13 on the brake pedal 12, causing the piston 7 of the master cylinder 6 to be driven forward through the drive transmitting means 10, the output member 5 and its abutting reaction disc 25, thus generating a liquid pressure in a liquid pressure chamber defined within the master cylinder 6.

At this time, because the clearance mentioned above remains between the reaction disc 25 and the reaction plate 26, a brake reaction which results from the liquid pressure generated in the liquid pressure chamber within the master cylinder 6 is transmitted to the output member 5 alone through the piston 7 and the reaction disc 25, but is not transmitted to the input member 4. Accordingly, the liquid pressure in the liquid pressure chamber within the master cylinder 6 rises independently from the force of depressing the pedal to provide a so-called jumping response until the reaction disc 25 is deformed by the brake reaction which results from the liquid pressure to abut against the reaction plate 26.

As part of the reaction from the reaction disc 25 begins to be transmitted to the input member 4, the controller 11 controls the motor 9 such that the brake reaction acting upon the reaction disc 25 is balanced with a sum of the propelling force from the output member 5 and the force of depressing the pedal which is transmitted from the input member 4.

Specifically, the controller 11 causes the motor 9 to rotate in the forward direction at a given rotational speed counter-clockwise as viewed in the drawing and with a given torque while controlling the electrical power supplied to the motor 9 with an increase in the force of depressing the pedal in accordance with the force of depression-master cylinder liquid pressure characteristic diagram which is previously stored on the basis of a depressing force signal from the depressing force sensor 13. As a consequence, the second pinion 22 which meshes with the first pinion 21 rotates clockwise, and the rack 23 which meshes with the second pinion 22 drives the output member 5 forward to urge the piston 7 of the master cylinder 6 through the reaction disc 25, thus causing a liquid pressure to be generated in the liquid pressure chamber. The liquid pressure generated in the liquid pressure chamber is supplied to wheel cylinders 15A, 15B through the braking liquid passage 15, thus effecting a braking action.

A reaction from the liquid pressure in the liquid pressure chamber of the master cylinder 6 is proportioned to the output member 5 and the input member 4 thorough the reaction disc 25, and part of the proportioned brake reaction is transmitted to the brake pedal 12 through the input member 4. When the brake reaction transmitted to the brake pedal 12 is balanced with the force of depressing the brake pedal 12, the input member 4 ceases to be driven forward at a corresponding position, whereupon the brake reaction transmitted to the output member is balanced with the output from the motor 9 at a corresponding position where the output member 5 ceases to be driven forward, thus achieving a servo balance condition.

In the servo balance condition, the stroke by which the input member 4 is driven forward and the stroke by which the output member 5 is driven forward are substantially equal to each other if brake reactions which are proportioned by the reaction disc 25 are different from each other.

It is to be noted that in the servo balance condition, a driver may unintentionally reduce the force of depressing the pedal to a degree, but with the electrically driven brake booster 1 according to the present invention which is provided with the reaction disc 25, there is little change in the brake output if the driver reduces the force of depressing the pedal to a degree, whereby a greater reliability can be assured for the driver. This is because there is a difference (hysteresis) between an input upon depression and an input upon release for which a same output is obtained due to the input member 4 (reaction plunger 26) and the reaction disc 25 which is compressed between the output member 5 and the piston 7.

As the brake pedal 12 is returned from the depressed condition to reduce the force of depression, its connected input member 4 and the reaction plunger 26 retract rearward.

On the other hand, the controller 11 causes the motor 9 to rotate in the reverse direction clockwise at a given rotational speed while controlling the drive current with a reduction in the force of depressing the pedal in accordance with the force of depression-master cylinder liquid pressure characteristic diagram which is previously stored. Accordingly, the second pinion 22 which meshes with the first pinion 21 rotates counter-clockwise, and the rack 23 which meshes with the second pinion 22 causes the output member 5 to retract rearward. The reaction disc 25 and the piston 7 which have been urged by the input member and the output member 5 now retract rearward, while the reaction disc 25 is gradually restored toward its original thickness.

When the brake pedal 12 is completely released, the input member 4 comes to a stop at its retracted end position shown where the step 4C abuts against the step member 3 under the tension of the return spring 24 while the controller 11 reverses the rotation of the motor 9 to the clockwise direction, whereby the output member 5 comes to a stop at its retracted end position shown where the rear end face thereof abuts against the stop member 3. The reaction disc 25 and the piston 7 are then no longer urged by the input member 4 and the output member 5, and accordingly, the braking liquid pressure is reduced to zero to cease the braking action.

It will be understood from the foregoing description that with the electrically driven brake booster 1 according to the present invention, part of the brake reaction is transmitted to the brake pedal, thereby permitting a braking operation to be effected accurately. In comparison to an electrically driven brake booster which includes a conventional drive transmitting means, the construction is simple and the weight is reduced. In addition, if the motor 9 fails for some reason, the depression of the brake pedal 12 allows the piston 7 of the master cylinder 6 to be driven forward through the input member 4, the reaction plate 26 and the reaction disc 25 independently from the output member 5, thus achieving a braking action which depends on the force of depressing the brake pedal.

Additional functions may be provided to the electrically driven brake booster 1 mentioned above. These functions do not require a modification of the arrangement of the electrically driven brake booster, but relate to a method of controlling the controller 11.

First, an intensifying function during a quick brake operation will be described. To provide the intensifying function during the quick brake operation, a pair of force of depression-master cylinder liquid pressure characteristic diagrams are stored in the controller 11, one representing a characteristic diagram which prevails during a normal depression and the other another characteristic diagram which prevails during an emergency depression and allowing a greater braking liquid pressure to be obtained. When the force of depressing the brake pedal which is input from the depressing force sensor 13 rises at a rate equal to or greater than a given value or when the rate of depressing the brake pedal 12 which is input from the displacement sensor 14 is equal to or greater than a given value, the characteristic diagram which prevails during the emergency depression is selected. When the characteristic diagram which prevails during the emergency depression is selected to control the motor 9, a greater boosting action than during a normal operation is delivered, allowing a higher braking effort to be produced.

Second, a parking retention control function will be described. The packing retention control function refers to continuing a brake action by retaining the energized condition of the motor 9 by the controller 11 if the brake pedal 12 is released in response to a detection of the depression of the brake pedal 12 which continues over a given time interval or longer in terms of either one of output signals from the depressing force sensor 13, the displacement sensor 14 and the liquid pressure sensor 16. If the depression of an accelerator pedal is detected during the continued parking, the controller 11 reverses the rotation of the motor 9 to terminate the brake action by causing the output member 5 to retract. The purpose of the parking retention control function is to continue the braking action automatically to prevent a vehicle from starting to move whenever the brake pedal 12 is kept depressed over a given time interval when the vehicle is parked.

Third, a regenerative braking coordination function will be described. The regenerative braking coordination function is intended to reduce a braking effort produced by the electrically driven brake booster 1, when it is used on a vehicle which is provided with a regenerative braking system, by an amount corresponding to the regenerating braking effort by the control of the motor 9 by the controller 11 when the braking action by the booster 1 and the braking action by the regenerative braking system are taking place concurrently. The use of the regenerative braking coordination function allows a brake feeling to be improved since the braking effort applied to the vehicle does not change with a force of depressing the brake pedal 12, independently from the operation of the regenerative braking system.

Fourth, an automatic brake function will be described. The automatic brake function is used in a car-to-car spacing control, a collision avoidance control, a vehicle attitude control, an anti-skid control upon starting or the like. Whenever the controller 11 determines that the braking action is required, it automatically controls the motor 9 to operate the output member 5 to bring a braking action into effect in order to maintain a car-to-car spacing between another vehicle running ahead, to avoid a collision with another vehicle or obstacle, to stabilize the attitude of a running vehicle or to prevent a racing of drive wheels upon starting. Even during the automatic brake operation, the output member 5 and the input member 4 are displaceable relative to each other, thus preventing the brake pedal from moving.

Figure 2:
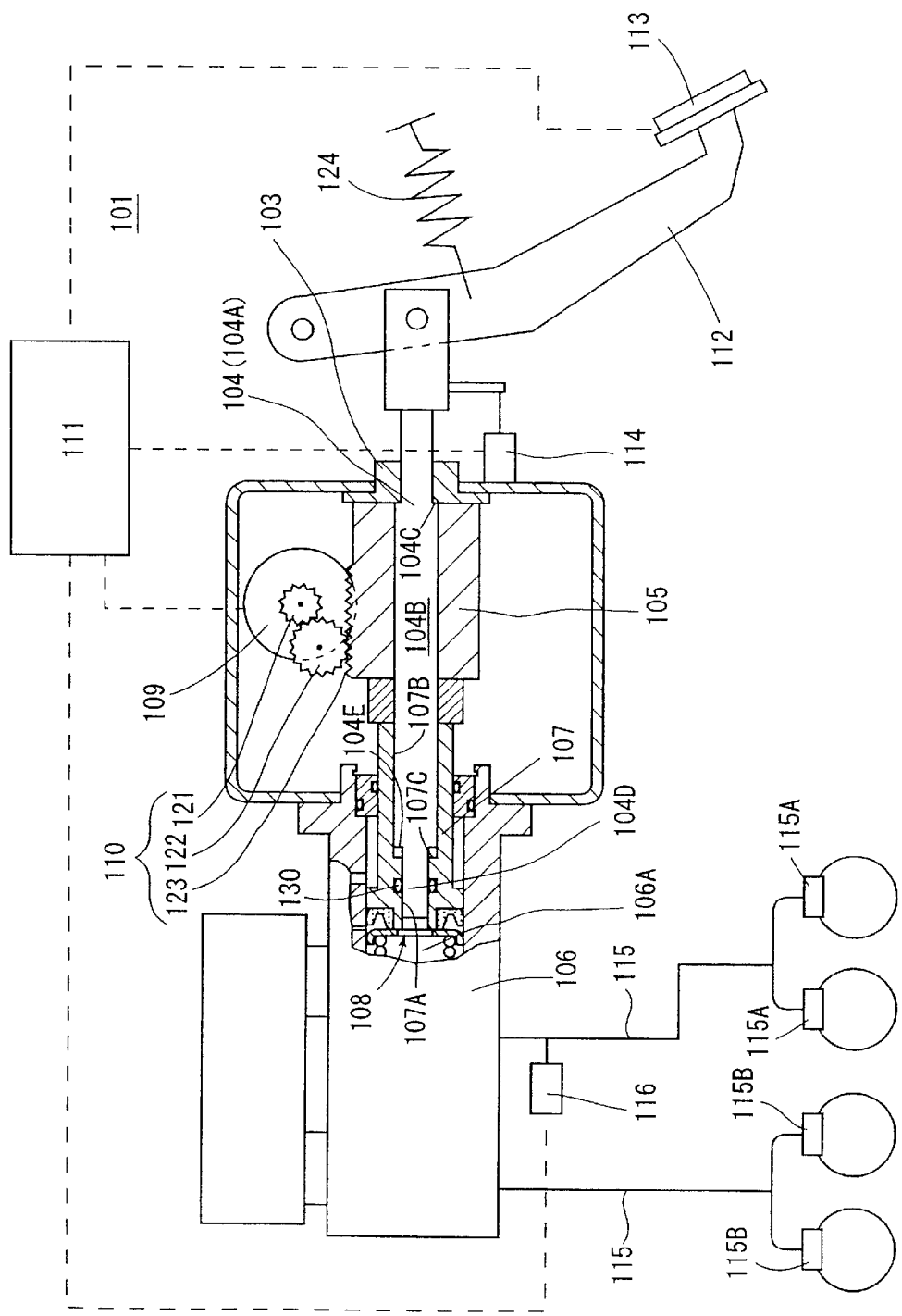
FIG. 2 is a longitudinal section of an electrically driven brake booster 101 according to a second embodiment of the invention.

FIG. 2 shows a second embodiment of the invention. In the first embodiment, the reaction transmitting means 8 comprises the reaction disc 25 and the reaction plunger 26. However, in the second embodiment, reaction transmitting means 108 comprises a piston 107 of a master cylinder 106 and an input member 104. In other respects, the arrangement is similar to the first embodiment, and accordingly, corresponding parts to those shown in the first embodiment are designated by like reference numerals as used before, to which 100 is added.

Specifically, a master cylinder 106 includes a substantially tubular piston 107, through which a rod-shaped input member 104 extends slidably, a front end face of the input member 104 directly facing a liquid pressure chamber 106A. The input member 104 comprises a front portion of a reduced diameter 104D which is fitted into an opening of a reduced diameter 107A of the piston 107, and a portion of an increased diameter 104B which continues from the portion 104D and which is fitted into an opening of an increased diameter 107B of the piston 107. A seal ring 130 is provided in the opening of a reduced diameter 107A of the piston 7 to maintain liquid tightness. The piston 107 has a rear end which directly abuts against an output member 105.

The operation of the electrically driven brake booster 101 will be described. In an inoperative condition shown where a brake pedal 112 is free from depression, the resilience of a return spring 124 urges the brake pedal 112 and the input member 104 rearward, whereby a step 104C on the input member 104 abuts against a stop member 103 and stays at its retracted end position. On the other hand, a controller 111 maintains the output member 105 at its retracted end position where it abuts against the stop member 103.

If the brake pedal 112 is now depressed, its connected input member 104 is driven forward, and the controller 111 controls a drive current to be applied to a motor 109 on the basis of a depressing force signal from a depressing force sensor 113 and a force of depression-master cylinder liquid pressure characteristic diagram which is previously stored, thus causing the motor 109 to rotate in a forward direction or counter-clockwise as viewed in the drawing at a given rotational speed and with a given torque. Accordingly, a second pinion 122 which meshes with a first pinion 121 rotates clockwise and a rack 123 which meshes with the second pinion 122 is driven forward to urge the piston 107 of the master cylinder 106. A braking liquid is then delivered from the rear liquid pressure chamber 106A of the master cylinder 106 to operate front wheel cylinders 115A for purpose of a braking action. At the same time, a braking liquid pressure is delivered from a front liquid pressure chamber, not shown, to operate rear wheel cylinders 115B for purpose of a braking action.

When the liquid pressure is generated in the liquid pressure chamber 106A as the piston 107 of the master cylinder 6 is driven forward in response to the operation of the motor 109, the liquid pressure acts upon the front end face of the input member 104, and a resulting force is transmitted, as part of a brake reaction, to the brake pedal 112 through the input member 104, and the liquid pressure in the liquid pressure chamber 106A also acts upon the front end face of the piston 107 to transmit part of the brake reaction to the output member 105.

Accordingly, the input member 104 ceases to be driven forward at a position where part of the brake reaction transmitted to the brake pedal 112 is balanced with the force of depressing the brake pedal 112, and the output member 105 also ceases to be driven forward at a position where part of the brake reaction transmitted to the output member 105 is balanced with the output from the motor 109, thus achieving a servo balance condition. In the servo balance condition, if brake reactions which are proportioned by the liquid pressure chamber 106A are different from each other, a clearance which is the same as under the inoperative condition is formed between a front step 104E of the input member 104 and the step 107C of the piston 107 since the stroke by which the input member 104 is driven forward and the stroke by which the output member 105 is driven forward are substantially similar.

When the brake pedal 112 is allowed to return under this condition to reduce the force of depression, its connected input member 104 retracts rearward.

On the other hand, the controller 111 reverses the rotation of the motor 109 into the clockwise direction and at a given rotational speed while controlling the drive current with a reduction in the force of depressing the brake pedal in accordance with a force of depression-master cylinder liquid pressure characteristic diagram which is previously stored. Accordingly, the second pinion 122 which meshes with the first pinion 121 rotates counter-clockwise, and the rack 123 which meshes with the second pinion 122 causes the output member 105 and the piston 107 to retract rearward.

When the brake pedal 112 is completely free from depression, the tension of the return spring 124 causes the rear step 104C of the input member 104 to abut against the stop member 103, whereby the input member 104 comes to a stop at its retracted end position shown. On the other hand, the controller 111 causes the motor 109 to rotate clockwise, thus causing the rear end of the output member 105 to abut against the stop member 103, whereby the output member 105 comes to a stop at its retracted end position shown. The reaction disc 125 and the piston 107 are then no longer urged by the input member 104 and the output member 105, and accordingly, the braking liquid pressure becomes zero to cease the braking action.

If the motor 105 should fail for some reason, the depression of the brake pedal 112 allows the input member 104 to be driven forward independently from the output member 105, allowing the front step 104E of the input member 104 to abut against the step 107C of the piston 107 to urge it, thus permitting the braking action to be obtained by only the force of depressing the brake pedal.

It will be understood from the foregoing description that the second embodiment allows a similar functioning and effect to be achieved as in the first embodiment except for the jumping response, and the intensifying function during the quick braking operation, the parking retention control function, the regenerative braking coordination function and the automatic brake function can also be applied to this embodiment in the similar manner as applied to the first embodiment.

It is to be noted that in the second embodiment, the input member 104 is arranged to be displaceable relative to the output member 105 and the piston 107 of the master cylinder 106, allowing the strokes of the input member 104 and the output member 105 to be different from each other. In this manner, the pedal stroke can be set up independently from the stroke of the piston 107 of the master cylinder 106.

Figure 3:
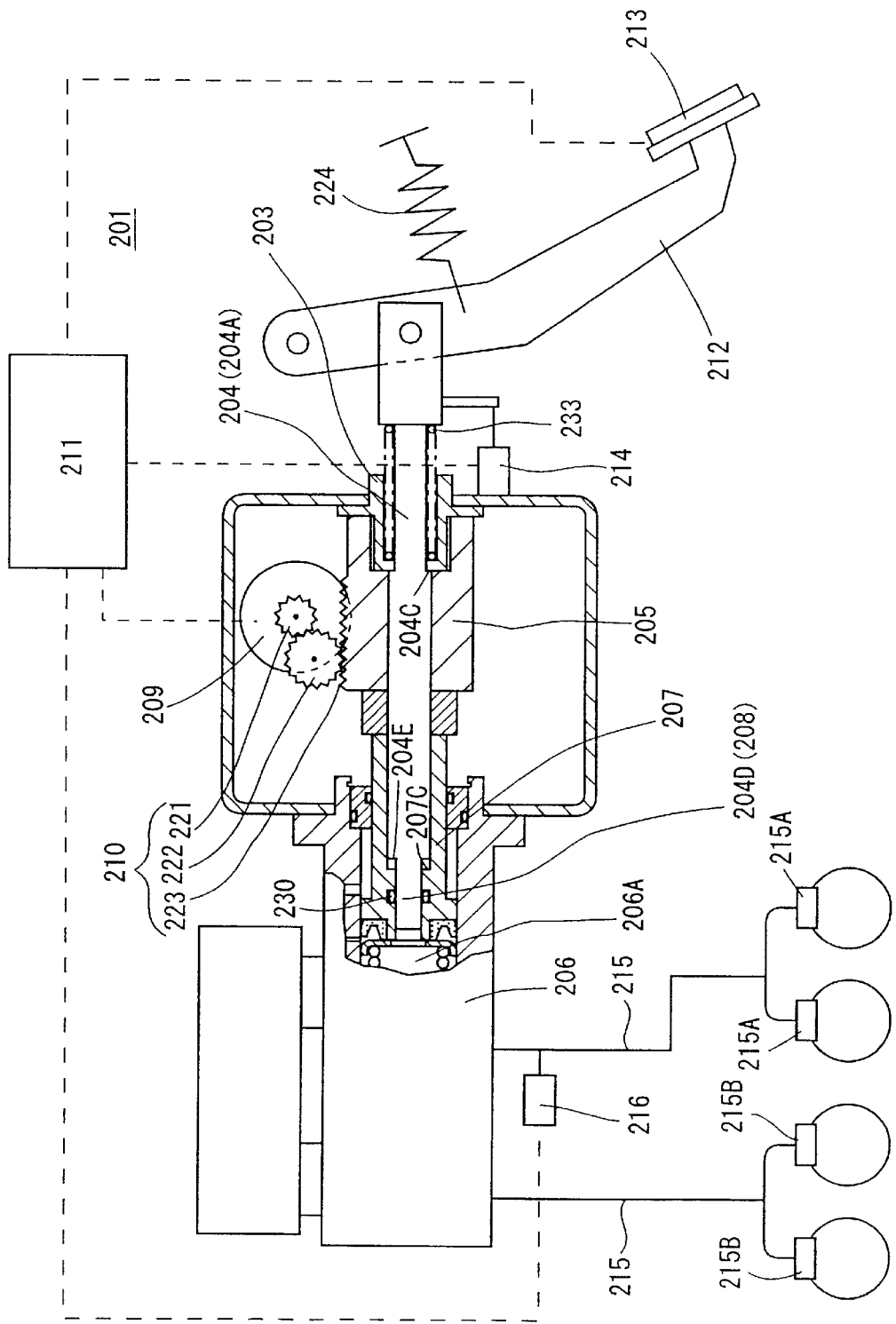
FIG. 3 is a longitudinal section of an electrically driven brake booster 201 according to a third embodiment of the invention.

FIG. 3 shows a third embodiment of the invention. What is modified in the third embodiment over the second embodiment is the provision of a spring 233 disposed between a stop member 203 (a housing 202) and an input member 204 to serve as means for urging the input member 204 in the opposite direction from the direction of the input, allowing the stroke of the input member 204 (or a brake pedal 212) to be set up independently from a stroke of a piston 207.

In other respects, the third embodiment is arranged in the similar manner as the second embodiment, and accordingly, corresponding parts to those shown in the second embodiment are designated by like reference numerals as used before, to which 100 is added.

Specifically, as a result of providing the spring 233, an equation for the balance between the input member 204 and the braking liquid pressure is given as follows:

$$Pm \times A1 + Fs = F1 \qquad (1)$$

By contrast, an equation for the balance between an output member 205 and the braking liquid pressure is given as follows:

$$Pm \times A2 = Fm$$

where Pm represents a braking liquid pressure in a liquid pressure chamber 206A, A1 a pressure responsive area of the input member 204, Fs the resilience of the spring 233, F1 an input, A2 a pressure responsive area of the output member 204 and Fm a motor thrust.

The braking liquid pressure Pm is proportional to the input F1 or $$Pm = F1 \times k1$$

The resilience Fs of the spring 233 is given as follows:

$$Fs = Fs0 + k2 \times L$$

where Fs0 represents a set load and L a displacement of the spring 233. Accordingly, the equation (1) is rewritten as follows:

$$F1 \times k1 \times A1 + Fs0 + k2 \times L = F1$$

Rewriting, we have $$L = F1 \times (1 - k1 \times A1)/k2 - Fs0/k2 \qquad (2)$$

The displacement L of the spring 133 is the same as the stroke of the input member 204, and it is seen from the equation (2) that the stroke of the input member 204 is proportional to the input F1 from the brake pedal 212 and has nothing to do to with the stroke of the output member 205 or the piston of the master cylinder 206. Thus, in the third embodiment, the stroke of the brake pedal can be set up independently from the stroke of the piston of the master cylinder 206.

It should be obvious that the third embodiment is capable of achieving a similar functioning and effect as achieved by the second embodiment. In addition, because the stroke of the input member 204 is proportional to the input F1, and is not influenced by the stroke of the output member 205 or the piston 207 of the master cylinder 106, the pedal stroke can be freely set up by changing the spring constant of the spring 233 or the pressure responsive area of the input member 204.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. An electrically driven brake booster comprising an input member disposed for back-and-forth movement in operative association with a brake pedal, an output member disposed in operative association with a piston of a master cylinder, drive transmitting means for translating a rotating motion of a motor into a linear motion to be transmitted to the output member, a controller for controlling the motor in accordance with a variable representing an amount by which the brake pedal is maneuvered, a displacement sensor for measuring a value representing a displacement of the input member and inputting the value into the controller, a depressing force sensor for measuring a force of depression on the brake pedal and inputting the value into the controller, a liquid pressure sensor for measuring braking liquid pressure in the master cylinder and inputting the value to the controller and reaction transmitting means for transmitting a reaction from the master cylinder to the output member and the input member at a given proportion, the drive transmitting means comprising a rack formed on the output member and a pinion disposed in operative association with the motor and in meshing engagement with the rack, the output member and the input member being axially displaceable relative to each other and the controller, based on the input signals from the displacement, depressing force and liquid pressure sensors, controls the torque output of the motor so that the force of depressing the pedal which is transmitted from the input member and a propelling force from the output member is balanced against an opposing force from the master cylinder.

2. The electrically driven brake booster according to claim 1, wherein the reaction transmitting means comprises a reaction disc of an elastic material which is provided between the piston of the master cylinder and the output and input members.

3. The electrically driven brake booster according to claim 1, wherein the reaction transmitting means comprises the piston of the master cylinder which is subject to a liquid pressure generated in a liquid pressure chamber within the master cylinder to engage the output member and a front end face of the input member extending through the piston of the master cylinder and facing the liquid pressure chamber.

4. The electrically driven brake booster according to claim 3, further comprising an energizing member disposed between the input member and a housing which supports the input member for urging the input member in a direction opposite from the direction of an input.

* * * * *